United States Patent Office 3,395,929
Patented Aug. 6, 1968

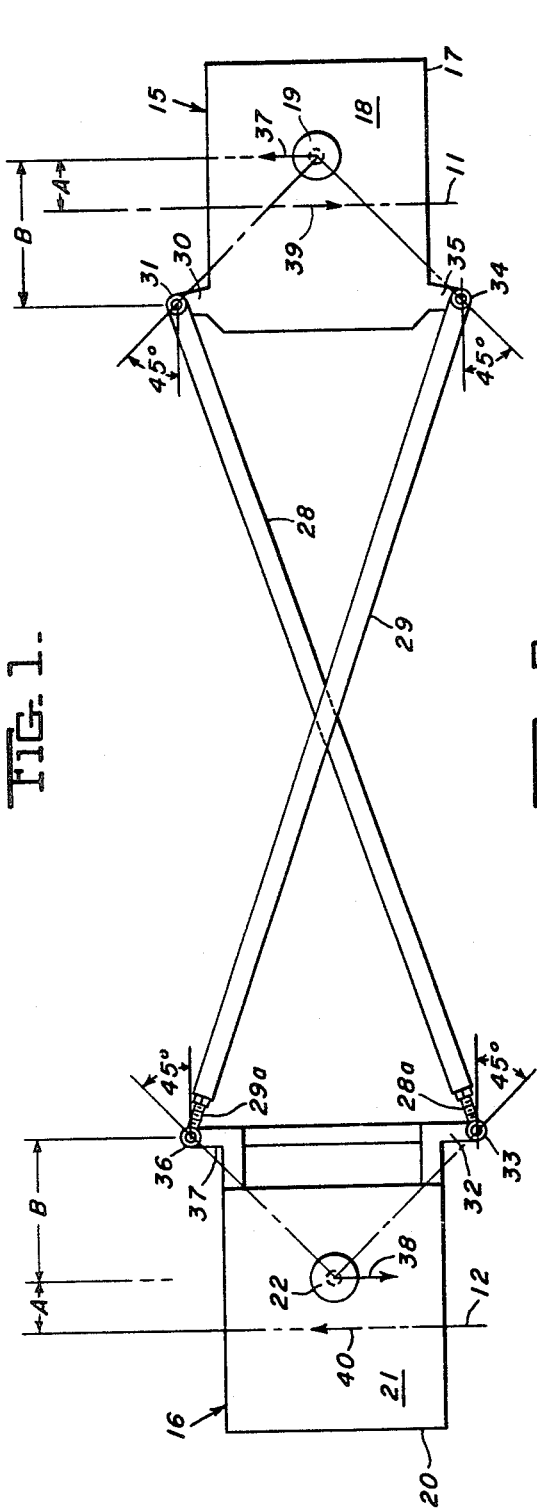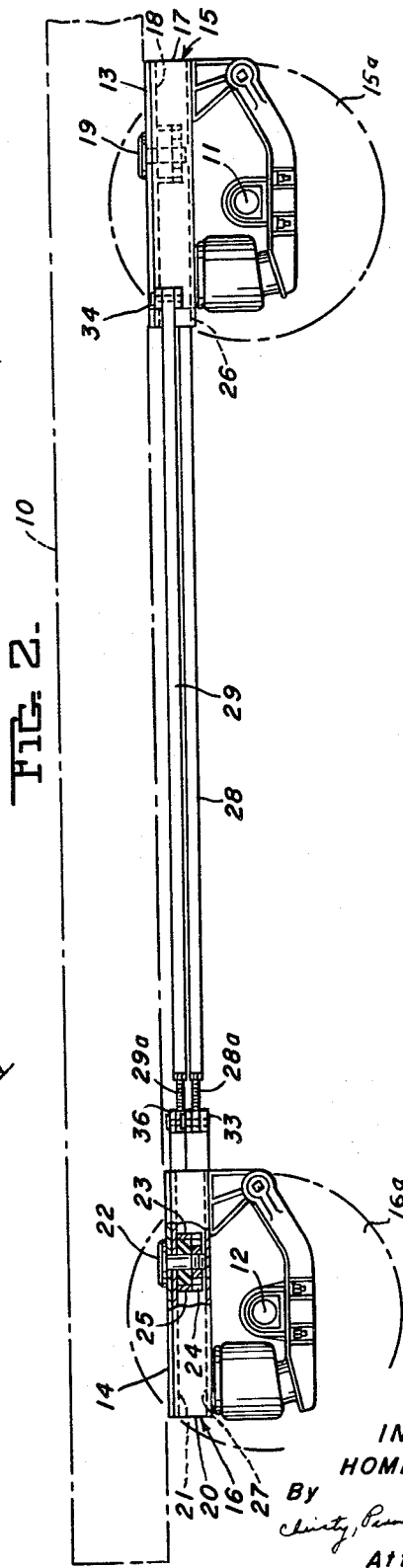

3,395,929
STEERING APPARATUS FOR TRAILERS
Homer Hoye, Box 128, New Bedford, Pa. 16140
Filed July 2, 1965, Ser. No. 469,257
8 Claims. (Cl. 280—81)

ABSTRACT OF THE DISCLOSURE

There are two spaced axles on the trailer each mounted beneath rotatable plates which are in turn each mounted to the underside of the trailer by means of a king pin so that each plate, axle and the wheels thereon may turn together. The axles are located rearwardly of their corresponding king pin so that turning forces from a tractor will cause the axles and wheels to turn differentially in yaw. Rigid stabilizing rods interconnect the two rotatable plates. Suspension means are provided for each axle and are mounted beneath the rotatable plates to turn therewith.

This invention relates to steering apparatus and particularly to steering apparatus for trailer-type vehicles.

Large truck tractor-trailer combinations are in wide use today for carrying goods of all descriptions in commerce. The present invention relates to the steering of the trailer wheels of a semi-trailer or the like. Present trailers do not have steerable wheels but rather have "dead" axles which are practically dragged around turns. With present arrangements the wheels exert powerful destructive forces on highways as well as on the tires themselves when negotiating turns and the tractor-trailer requires a large turning radius. Because of this and because the wheels are not steerable, on large trailers with double axles near the rear of the trailer, the axles must be spaced rather closely together. With the advent of larger and larger trailers the problem is compounded. Moreover, within certain limits, under the laws of many states the permissible load per axle may be increased if the longitudinal spacing between axles is increased. By providing a means for steering the trailer wheels the axles may be spaced further apart and at the same time overcome the aforementioned difficulties encountered with non-steerable wheels.

According to the invention apparatus is provided for steering the trailer wheels with no other connection with the tractor than the trailer frame itself. The steering force is derived from the forces exerted on the trailer frame and the frictional forces between the tires and road surface. The apparatus is so arranged that the two trailer axles steer differentially while negotiating a turn and the rear-most wheels track the forward trailer wheels almost exactly throughout the turn. The trailer axles, wheels and wheel suspensions are mounted on a plate member which in turn is pivotally mounted in slidable engagement with a similar plate member rigidly mounted to the underside of the trailer frame. The pivotal connection between the two plates on both front and rear assemblies is positioned forward of the corresponding axle, so that the frictional forces between the tires and road surface act through each axle on a turning moment arm equal to the longitudinal distance between the axle and the pivotal connection. Thus, on a left turn the front axle initially steers left and the rear axle steers right and vice versa for a right turn. To stabilize the steering action and to enable more accurate tracking of the front and rear wheels there are provided cross-connecting bars or rods between the pivotal front and rear plates. One rod is pivotally connected to the rear-left of the front plate and to the front-right of the rear plate and the other rod is oppositely connected so that the two rods are connected in X-fashion.

An object of the invention is to provide new and useful steering apparatus for trailers and the like.

This and other objects will be apparent to those skilled in the art and more fully understood by reference to the following description wherein:

FIG. 1 is a plan view, partly schematic, of the apparatus of the invention; and

FIG. 2 is a side elevation in partial broken section showing the apparatus of FIG. 1 mounted on a typical trailer.

Referring to the drawings, 10 is a trailer frame supported on two axles 11 and 12, being forward and rear axles respectively, on the rear portion of the trailer. Rigidly mounted on the underside of the trailer body or load supporting frame 10, there are front and rear plate members 13 and 14 respectively, which provide a bearing surface for the pivotally mounted front and rear steering assemblies 15 and 16. Each of the assemblies 15 and 16 are, therefore, mounted against the bearing plates so as to be substantially flush against the underside of the trailer body 10. By so mounting the rotatable members 15 and 16 the trailer height can be optimized to permit a maximum of cargo space while the trailer is still low enough to clear tunnels, utility lines and other restricted areas, and the center of gravity of the trailer and load is kept as low as possible. Also the weight of the trailer is distributed over the entire area of the rotatable assemblies 15 and 16 rather than concentrating the weight on the king pins or vertical pivot pins.

Each assembly 15 and 16 carries an axle, suspension system with a wheel and tire of conventional design at each end of each axle, these wheels being schematically indicated at 15a and 16a respectively. The front assembly 15 comprises a generally rectangular box-like frame member 17 open at front and rear and pivotally mounted under the plate 13. The member 17 comprises an upper plate 18 abutting the plate 13 on the trailer and pivotally mounted thereon by the pivot pin 19 located longitudinally forward of the axle 11 by the distance A. The rear assembly 16 likewise comprises a generally rectangular box-like frame member 20 pivotally mounted on the plate 14. The member 20 comprises an upper plate 21 abutting the plate 14 on the trailer and pivotally mounted thereon by the pivot pin 22 located longitudinally forward of the axle 12 by the distance A, the same spacing as with the pin and axle of the front assembly 15. Part of frame 20 is broken away to reveal in section the pivotal connection between the plates 14 and 21. The connection comprises the pivot pin 22, bushing 23, nut 24 and collar 25 depending from the plate 21. Pin 19 on the front assembly previously described, is mounted in the same manner. The lower plates 26 and 27 on the frames 17 and 20 respectively, each carry their respective axles, wheels, tires and suspension systems which turn with the frames. The suspension system illustrated is a combination pneumatic and torsion bar system known in the art and does not form part of the present invention per se and so is not further described. Pneumatic connections between the front and rear wheels are not shown for convenience in illustration. Other types of suspension systems could, of course, be used with the invention. Preferably each air bag of the suspension system is mounted on the underside of the rotatable assemblies 15 and 16 whereby each bag is freely rotatable therewith. Each bag is also mounted rearwardly of its corresponding axle.

Interconnecting the frames 17 and 20 there are two vertically spaced cross-connecting rods 28 and 29 arranged in X-fashion beneath the trailer. Each of the rods is pivotally connected at opposite ends to the frames 17 and 20. Rod 28 is pivotally connected at its forward end to the lateral extension 30 on frame 17 by means of the pivotal connection indicated at 31, and at its rearward end to the lateral extension 32 on frame 20 by means of the pivotal connection indicated at 33. In like manner rod 29 is connected to frame 17 by pivotal connection 34 on lateral extension 35, and to frame 20 by pivotal connection 36 on lateral extension 37. Means, such as the turnbuckles 28a and 29a, are provided at one end of each rod 28 and 29 for adjusting the effective length of the rods to the desired length. The two rods 28 and 29 are symmetrically arranged about the longitudinal centerline passing through the pivot pins 19 and 22. The pivotal connections 31 and 34 on frame 17 lie on a vertical plane longitudinally spaced rearwardly of pivot pin 19 by the distance B and each of the connections 33 and 36 on frame 20 are similarly spaced forward of pin 22 by the same distance B. The rods are also preferably connected to the frames in a manner such that a line through any given rod pivotal connection and its corresponding frame pivot pin makes an angle of 45° with the longitudinal centerline through the pivot pins 19 and 22. Preferably the lateral spacing is the same between the rod pivotal connections 31 and 34 on the one hand and 33 and 36 on the other hand.

The operation of the steering apparatus may be explained as follows. When the truck tractor (not shown) turns left (to top of FIG. 1) moving forward it exerts a force on the trailer frame which is felt at the pivot pins 19 and 22. The trailer frame acts somewhat as a lever so that the turning force is exerted on the front pivot pin 19 in the direction of arrow 37 and on the rear pivot pin 22 in the direction of arrow 38, which is opposite in direction to the force on the front pin. These forces in turn are transmitted to the tires and road surface and the frictional forces therebetween act through the axles 11 and 12 in the direction of the arrows 39 and 40, respectively, opposite in direction to the forces on the pivot pins. Each of the forces act through a turning moment arm A between axle and pivot pin so that the front axle is turned left and the rear axle is turned right. The cross-connecting rods 28 and 29 serve to equalize the turning action so that the wheels will track almost exactly throughout the turn. The rods also help prevent wobbling and other spurious steering actions at high speeds and on bumpy roads. As the tractor swings out of its turn the turning forces on the axles are reversed, thereby returning the axles to a neutral position when tractor and trailer are again aligned. For a right turn the steering action is opposite that for a left turn. The same resultant forces acting on the trailer frame will produce the same steering action whether moving forward or backward.

The steering apparatus of the invention provides a simple and relatively inexpensive means for steering trailers, particularly large trailers in a tractor-trailer combination vehicle. By steering the trailer there is less strain on tires, road, trailer and tractor and the turning radius is reduced thereby increasing maneuverability.

While one embodiment of the invention is illustrated it will be apparent to those skilled in the art that variations and modifications in the particular construction and arrangement of parts can be made within the scope and spirit of the invention.

I claim:

1. Steering apparatus for trailer type vehicles having longitudinally spaced axles and wheels carried by each axle for supporting the vehicle on a ground surface, comprising, first and second longitudinally spaced rotatable members each mounted substantially flush against the underside of the vehicle for rotation about a vertical axis and each member carrying one of the axles and its corresponding wheels, each axle on a given rotatable member being longitudinally spaced rearwardly of the vertical axis of rotation of the rotatable member on which it is mounted and suspension means mounted on the underside of each rotatable member rearwardly of each axle for free rotation therewith.

2. Steering apparatus as defined in claim 1 wherein the suspension means is pneumatic.

3. Steering apparatus for trailer type vehicles having longitudinally spaced axles and wheels carried by each axle for supporting the vehicle on a ground surface, comprising,
   (a) a pair of longitudinally spaced plate members mounted on the underside of the vehicle,
   (b) a plate member rotatably mounted under and secured to each of the first-named plate members for rotation about one of the pivot pins, each rotatable plate carrying one of the axles and its corresponding wheels, and being so arranged that each axle is longitudinally spaced rearwardly of its corresponding pivot pin when the axle is in a normal rest position at right angles to the longitudinal axis of the vehicle, whereby each axle and the wheels carried thereby steer differentially with respect to the longitudinal axis of the vehicle when a turning force is applied to the vehicle forward of the forward-most axis of rotation,
   (c) means inter-connecting the rotatable plates for substantially equalizing the rotation thereof, and
   (d) suspension means for each axle mounted on each rotatable member for free rotation therewith.

4. Steering apparatus as defined in claim 3 wherein the inter-connecting means comprises a pair of rods arranged in X-fashion with their opposite ends on different sides of the vehicle longitudinal axis.

5. Steering apparatus as defined in claim 4 wherein each rod pivotal connection is so arranged that a line through each pivotal connection and the vertical axis of rotation of the rotatable plate on which it is mounted defines an angle of approximately 45° with the longitudinal axis of the vehicle and wherein the longitudinal spacing between the vertical axis of rotation of each rotatable plate and the rod pivotal connections on each plate is substantially the same for each plate.

6. A trailer having a frame and spaced front and rear transverse axles, each axle having a wheel at each end thereof, a support for each axle, each support being connected to the frame for pivoting movement about a vertical axis on the longitudinal center line of the frame, said vertical pivoting axis for each support being located forwardly of its axle the same distance as the other, and cross linkage means operatively connecting the two supports for effecting simultaneous equal pivotal movement of the two supports about their respective vertical axes in opposite directions, and suspension means for each axle mounted on the axle supports for free pivoting movements therewith.

7. Steering apparatus for trailer type vehicles having a trailer load supporting frame and longitudinally spaced axles and wheels carried by each axle for supporting the vehicle on a ground surface comprising,
   (a) first and second longitudinally spaced vertical pivot pins secured to the trailer load supporting frame,
   (b) first and second longitudinally spaced rotatable members each mounted substantially flush against the underside of the trailer load supporting frame for rotation about one of the pivot pins, each member carrying one of the axles and its corresponding wheels, at least one of the axles being longitudinally rearwardly spaced from its corresponding pivot pin,
   (c) means interconnecting the first and second members for transmitting rotational movement from one member to the other, and
   (d) suspension means for each axle mounted on the underside of each rotatable member and rotatable therewith.

8. Steering apparatus for trailer type vehicles having a trailer load supporting frame and longitudinally spaced axles and wheels carried by each axle for supporting the vehicle on a ground surface comprising, (a) first and second longitudinally spaced plate members mounted on the trailer load supporting frame, (b) a pair of longitudinally spaced pivot pins secured to the trailer load supporting frame, each of the pins extending downwardly through a different one of the plate members, (c) a plate member rotatably mounted under and secured to each of the first-named plate members for rotation about one of the pivot pins, each rotatable plate carrying one of the axles and its corresponding wheels, and being so arranged that each axle is longitudinally spaced rearwardly of its corresponding pivot pin when the axle is in a normal rest position at right angles to the longitudinal axis of the vehicle, whereby each axle and the wheels carried thereby steer differentially with respect to the longitudinal axis of the vehicle when a turning force is applied to the vehicle forward of the forwardmost axis of rotation, wherein the longitudinal spacing between each axle and its corresponding pivot pin is the same for each axle, and (d) means interconnecting the rotatable plates for substantially equalizing the rotation thereof.

References Cited
UNITED STATES PATENTS

| | | | |
|---|---|---|---|
| 1,544,465 | 6/1925 | Lovell et al. | 280—102 |
| 1,594,876 | 8/1926 | Clark | 280—102 |
| 2,433,268 | 12/1947 | Fellabaum | 280—81 |
| 3,044,795 | 7/1962 | Standing et al. | 280—81 |
| 3,047,306 | 7/1962 | Easton | 280—81 |
| 3,093,388 | 6/1963 | Kulyk | 280—81 |
| 3,284,094 | 11/1966 | Grace | 280—81 |
| 3,051,506 | 8/1962 | Stump et al. | 280—81 |
| 3,204,977 | 9/1965 | Eisenhauer et al. | 280—81 |

KENNETH H. BETTS, *Primary Examiner.*

UNITED STATES PATENT OFFICE
CERTIFICATE OF CORRECTION

Patent No. 3,395,929            August 6, 1968

Homer Hoye

It is certified that error appears in the above identified patent and that said Letters Patent are hereby corrected as shown below:

Column 4, line 23, after "thereof," insert -- wherein the interconnecting means comprises a pair of rods pivotally connecte at their opposite ends to different ones of the rotatable plates and so arranged that the rods extend diagonally of the trailer longitudinal axis in opposite directions, --.

Signed and sealed this 13th day of January 1970.

(SEAL)
Attest:

Edward M. Fletcher, Jr.
Attesting Officer

WILLIAM E. SCHUYLER, JR.
Commissioner of Patents